INVENTOR
JACOB RABINOW
BY Joseph A. Genovese
ATTORNEYS

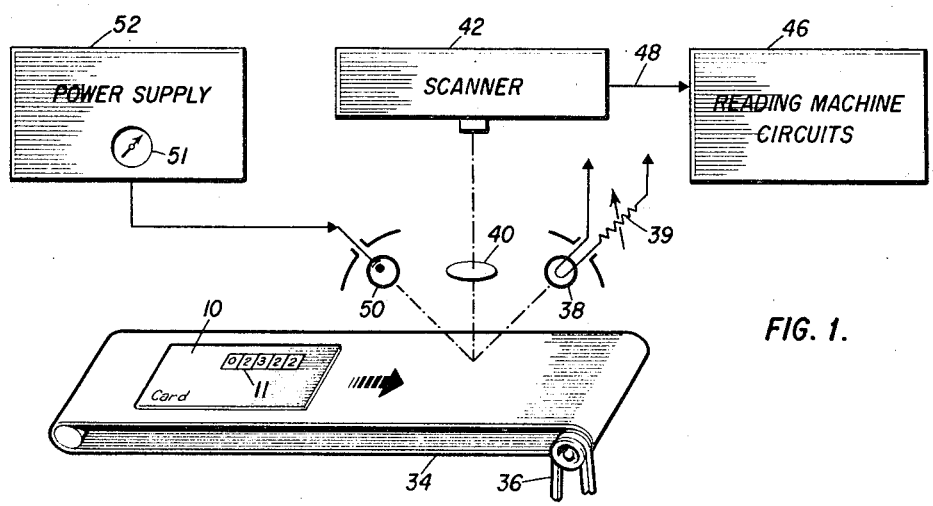
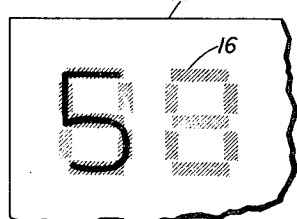
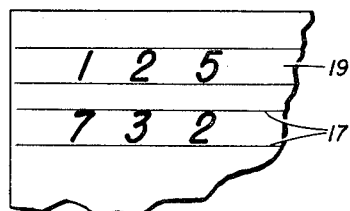
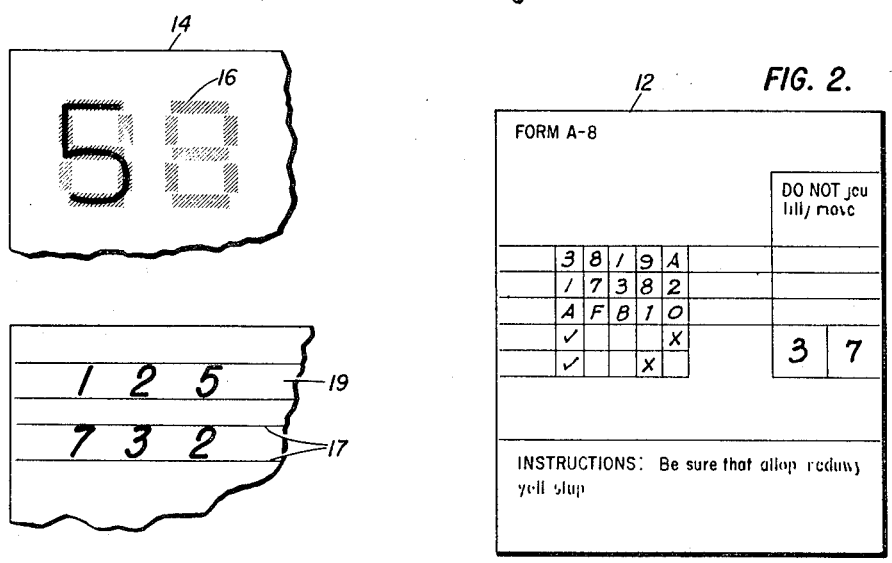
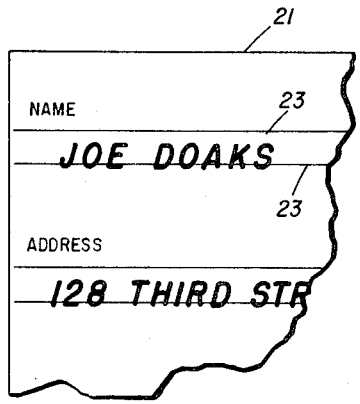
JACOB RABINOW
INVENTOR

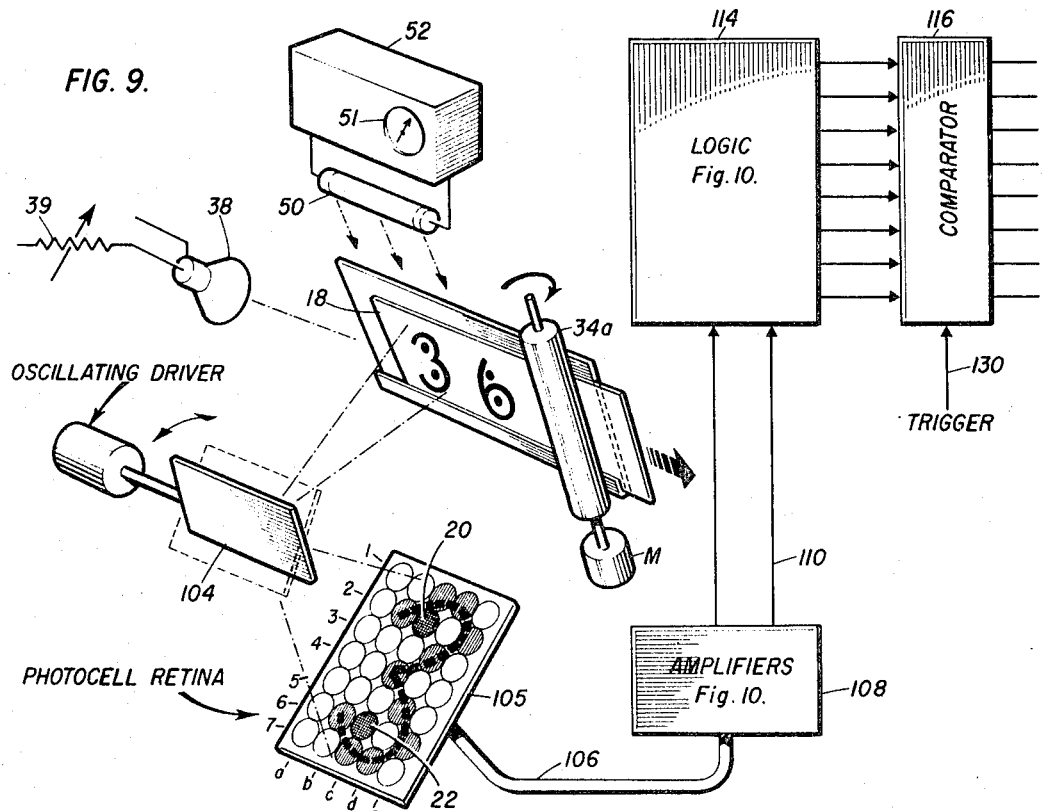
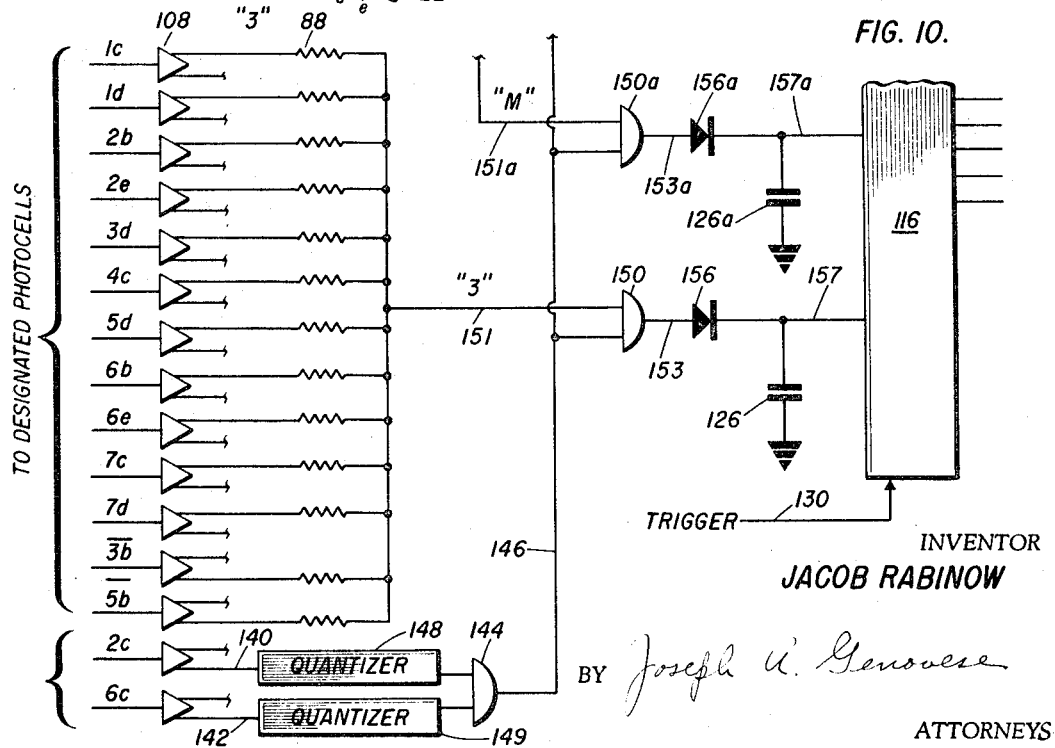

JACOB RABINOW
INVENTOR

BY Joseph A. Genovese

ATTORNEYS

United States Patent Office 3,444,517
Patented May 13, 1969

---

3,444,517
OPTICAL READING MACHINE AND SPECIALLY PREPARED DOCUMENTS THEREFOR
Jacob Rabinow, Bethesda, Md., assignor to Control Data Corporation, Rockville, Md., a corporation of Minnesota
Filed Mar. 9, 1965, Ser. No. 438,310
Int. Cl. G06k 9/18; G01n 21/38
U.S. Cl. 340—146.3                                6 Claims

ABSTRACT OF THE DISCLOSURE

An optical character reading machine for documents containing characters printed in ordinary ink and containing visible fluorescent marks so designed that they emit energy and cooperate with the machine in a manner that the machine finds the marks to be indistinguishable from the background of the characters or detects the marks as being of greater light-video signal strength than the light-video signals representing the character background. In the latter case such signals may be used to provide control signals for the machine.

---

This invention relates to optical reading machines and more particularly to machines and character-bearing surfaces containing various visible marks, such as guide lines, constraint dots or areas, print, and others in addition to the characters to be identified by the machine.

For many years a great deal of effort has been devoted to the development of portions of reading machines, particularly their scanners, the central logic, and decision sections. As is known, the scanner of a reading machine deals with the extraction of data from characters printed (by hand or otherwise) on a surface, while the logic is concerned with processing the data extracted by the scanner. The decision section is concerned with ultimate identification of a scanned character on the basis of the scan data after processing by the logic circuits of the machine. This developement effort, as exemplified by the disclosures in numerous patents, has been directed toward new techniques and means for identifying individual printed characters. To my knowledge, comparatively little effort has been devoted toward solutions to several difficult problems encountered in commercially using optical character reading machines. In other words, it is one thing to read characters printed in an ideal environment, and quite another to read characters as printed in business (or other) transactions.

A number of commercially available reading machines function well in identifying characters which are well separated from extraneous lines, dots, printed material, and other visible matter (simply called "marks" in most instances herein) which is not intended to be read by the machine. In explanation, reading machines do not experience great difficulty in identifying a single character or line of characters on an otherwise clear surface. Similarly, many optical character reading machines experience little difficulty in identifying all of the characters on an entire page, provided that there is nothing else on the page (assuming, of course, that the characters are so formed and positioned that there are no registration difficulties or other difficulties well-known in the art). In certain commercial reading applications characters can be so formed, however, there are other applications for reading machines where the print is not or cannot be in an ideal environment, e.g., printed on an otherwise clear, clean (usually white) surface. For commercial adaptability it is sometimes essential that characters be printed on forms which are preprinted in a manner such that areas are separated by visible lines or other marks. Such lines are necessary for separating the data in an orderly fashion. Many Government-provided forms such as income tax return forms, Census forms, Treasury and Patent Office forms, and others, have boxes within which to print information. Most forms such as these (and many others) contain printed instructions in addition to the characters which are to be read by the machine. Also, it has been found that machine-identification of hand-printed characters is most difficult. Thus, visible constraint marks on a sheet are not uncommon. The problem presented by the above facts can be resolved through a single interrogatory. How can an optical character reading machine which relies on light reflectance and absorption from the character-background and from the characters themselves, distinguish between the true characters (those which are to be identified by machine) and other visible marks adjacent to the characters, touching or passing through the characters, or for that matter, anywhere on the sheet, card, or other surface on which the characters are formed?

An object of my invention is to provide means not only to enable an optical character reading machine to distinguish between the characters which are desired to be read and other visible (to the human eye) marks, but also to accomplish this in a practical way which does not affect the reading capability of the machine.

My invention achieves the above objective by having all of the marks (lines, instructions, indicators, etc.) printed with an ink, dye or the like, containing a fluorescent material, and by subjecting the document to exciting radiation during the reading cycle. The true characters will reflect very little of these radiations, but the marks will be energized in a manner to emit energy to which the scanner photocell (or photocells) is sensitive. Thus, although the marks under ordinary light appear ordinary to the eye, when energized they, in cooperation with their radiation source, emit energy in such a way that the scanner photocell provides output signals as though (a) the marks did not exist or (b) the marks are "brighter" than the background or the characters. This leaves the entire black-to-white range for machine-examining the characters completely unaffected.

It will be noted that the marks discussed above can be formed in many colors, but that my invention is not to be confused with color discrimination to solve the same problem. Color discrimination compromises the available black-to-white range in which scan-data is extracted from a true character and its background. My invention does not.

I have had reading machines constructed which use red-sensitive photocells (for example, silicon cells or the equivalent) and have required that the documents to be read by machine have the true characters printed in black, while all of the preprinted lines, marks, instructions, etc. are in red. Theoretically, the scanner would detect only the black characters while the red marks would appear as "white" to the photocells. This was only moderately successful for several reasons. Red-sensitive photocells are comparatively slow and require considerably more light than, for example, 931–A photomultipliers which are almost completely insensitive to red. Furthermore, the kind and shade of red ink had to be very carefully controlled. Silicon cells, being infrared sensitive, cannot detect inks made of dyes (e.g. aniline dye). Thus characters formed by dye ribbons and most ball point pens cannot be detected at all. Logical difficulties were encountered. Where field marks were required, they either had to be printed in black or a separate scanner installed to detect them, because the red-sensitive cells could not detect red field marks. Further, the red color was found to be psychologically objectionable. People are accustomed to forms with either black lines, marks, etc. or blue lines, marks, etc.

I have also tried using very pale blue ink for the marks on the theory that the response to the scanner photocells would be so small in comparison to response to black characters, that the reflections from the blue marks could be treated as noise and neglected by the machine. This method is not entirely satisfactory particularly when light printing is encountered, because the "noise" becomes indistinguishable from the true signals. When the machine is adjusted (for example by lowering the quantizing level) to detect lightly printed characters, there is often a confusing machine-response to the blue lines, printed instructions, marks, etc. To avoid this the light "background" colors must be made so light that they cannot be easily seen by the human operation for whom they are intended in the first place.

The advantage of having the marks energized to a level such that the energy reaching the photocells from a mark is such that the mark becomes indistinguishable from the background of the character is apparent. The advantage of energizing the marks in a manner such that they will appear "whiter-than-white" to the photocells may be subtle. Optical scanners for reading machines rely on the difference in light reflectance between the printed characters and the background area on which the characters are printed. By having, for example, field marks or constraint marks cause a photocell response greater than that from the background area, means can be provided in the reading machine by which to detect and use (e.g. as control signals) the comparatively highly energized marks while leaving the entire black-to-white range between the character and its background completely undisturbed so that it is available for use in identifying the true characters.

Accordingly, a further object of my invention is to provide a reading machine with means cooperating with specially prepared forms, documents, sheets, or other surfaces on which characters to be read by machine are formed, in a manner such that marks other than the true characters are either (a) indistinguishable by the machine from the background reflectance of the surface owing to the emission of energy from the marks or (b) distinguishable from the background area of the characters by the emission of energy in a range greater than the energy of the light reflected from the background area of the characters.

Another object of my invention is to provide a document having marks which are plainly visible under ordinary light, but which are capable of being energized, e.g. by ultraviolet light, to radiate energy so that upon examination by a photocell which is responsive to such energy, the photocell output signals for the surface of the document and for the energized mark are either substantially indistinguishable, or distinguishable from background area by virtue of the energy radiated from the marks being greater than that reflected from the surface.

Another object is to provide means for adjusting the nature and/or intensity of the incident light so as to control the contrast between the marks on the surface (usually paper) and the remaining area of the paper.

Other objects and features will become apparent in following the description of the illustrated forms of the invention which are given by way of example only.

FIGURE 1 is a functional diagram showing a reading machine in accordance with the invention.

FIGURE 2 is a view showing a printed form in accordance with the invention.

FIGURES 3 through 3b are fragmentary views showing surfaces having various types of constraint marks for characters and/or to provide machine-control signals of several kinds.

FIGURE 9 is a partially perspective and partially diagrammatic view showing a different style of reading machine in accordance with the invention.

FIGURE 10 is a fragmentary view showing details of the reading machine in FIGURE 9 and showing particularly a means to develop a control signal from the fluorescent marks on the document of FIGURE 9.

Most optical character reading machines are required to identify characters printed upon an optically contrasting surface. The usual requirement is that the characters be dark (called "black") and the background be light (called "white") so that the black-to-white ratio is as large as possible. The reason is that under ordinary light (e.g. an incandescent lamp) the characters are as light-absorbent as possible, while the background area is as light-reflective as possible within limits of practicability. As discussed before, considerable difficulty is experienced in many reading machine assignments because of the requirement that there be extraneous printed matter on the same surface as the characters which are to be identified. Such printed matter (called "marks") may be in the form of lines, written instructions and many other things all of which similarly adversely affect the operation of optical character reading machines. Where marks are required, a reading machine which relies upon differences in light reflectivity to extract information from each character and its background area cannot easily distinguish between the true characters and the marks.

I have illustrated a number of documents in FIGURES 2–5, 8, and 9 which are typical, as all styles found in industry and commerce and Government cannot be shown. Document 10 (FIGURE 1) is a business card printed or imprinted with a single line of characters to be read by an optical character recognition machine. The characters are formed in individual preprinted boxes 11 which must be seen by the human being, but which must not interfere with machine-identification of the characters. Document 12 (FIGURE 2) is a preprinted form with lines, a printed instruction, and other matter in addition to the alphanumeric data within the boxes. This alphanumeric data is to be read by machine. The checks in certain of the boxes are to be mark-sensed. Document 12 is illustrated principally to show the application of my invention to page reading machine as opposed to machines designed for single character or single or double line reading. FIGURE 3 shows Document 14 having hand-printing constraint marks 16 arranged in a seven-element pattern. The pattern of marks must be visible to the eye to enable the user to hand-print characters on the constraint elements. As is well-known in the art, this is to help overcome registration problems and to limit size variations for hand-printed characters. Document 18 in FIGURE 4 has a different type of constraint mark, consisting of a pair of dots 20 and 22 which, like elements 16, must be visible to the eye. The purpose of the dots 20 and 22 is similar to the constraint marks on Document 14.

Figure 5:
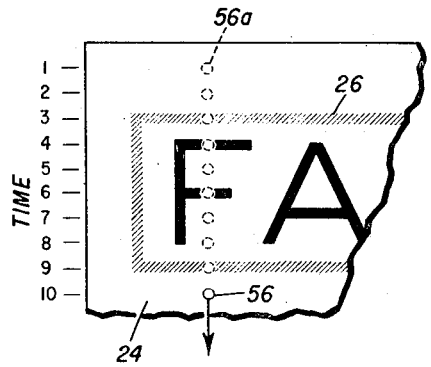
FIGURE 5 is a fragmentary view showing characters printed within a constraint box, this view also showing the vertical traverse of a scan element and ten typical sample points along the vertical traverse.

Document 24 in FIGURE 5 shows mark 26 in the form of a rectangle which is a very common configuration to require typists to print within prescribed areas. As in all other cases, the mark 26 must be plainly visible to the eye.

Figure 8:
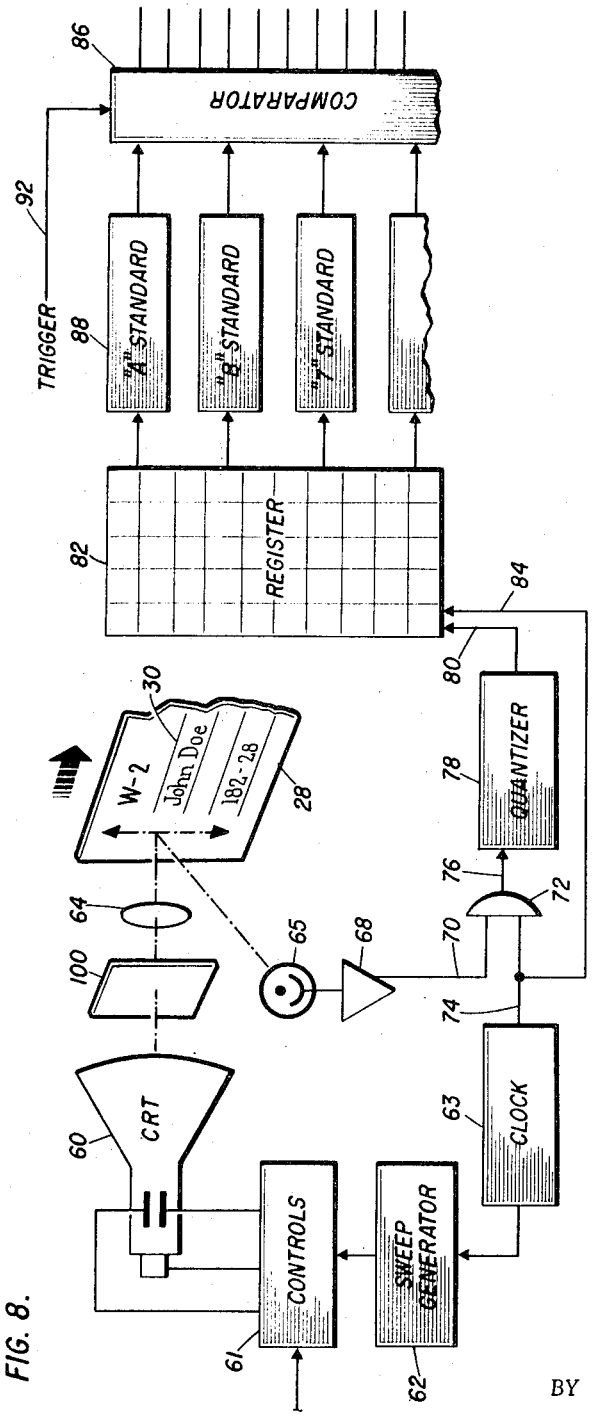
FIGURE 8 is a partially perspective and partially diagrammatic view showing a reading machine in accordance with the invention.

In FIGURE 8 I have shown document 28 having horizontal marks 30 between which typewritten characters are formed. Document 28 can, for example, represent Internal Revenue Service Form W-2 containing the name, social security number, and amounts withheld and other pertinent information which is to be read by machine, whereas the printed instructions on the W-2 form are obviously not to be read by machine. In all instances it is stressed that the particular business, commerce, or other use for which a document is designed has no bearing on my invention. Any document which is adapted to be machine-read and which contains any kind of mark in addition and/or extraneous to the characters to be read by machine can fall within the purview of my invention.

In my invention I provide markings on a surface (regardless of the purpose of the markings) which can easily be noted and/or read by a human being, but which do not in any way interfere with detection and identification of the characters on the document which are intended to be read by machine. This applies whether the characters are spaced from the markings on the document or whether they are very close to the markings or whether there is an overprint condition as, for example, in FIGURE 3b. To accomplish this, the markings on each of the documents are formed by or contain fluorescent material which emits energy when subjected to exciting radiations. A number of fluorescent materials which are suitable for my purpose are disclosed and identified in U.S. Patent No. 2,609,928, although there are others and/or variations thereof commercially available under a number of trade names. A source of exciting radiations suitable for my purpose is the mercury vapor discharge lamp mentioned in the above patent, or any other lamp or source which is capable of emitting radiations of a wavelength of approximately 3500–4000 angstrom units (the ultraviolet region). Thus, a photocell which is sensitive to the energy emitted by the fluorescent mark, and which is also sensitive to ordinary light and lack of light reflected from the document, will provide output signals (upon scanning of the document) exactly as desired; namely, as though the fluorescent mark did not exist and if desired, as though the fluorescent marks were "whiter" than the background of the character. One photocell which meets the above requirements is the RCA–931–A photomultiplier, and there are others (e.g. RCA 6199) listed in several tube manuals. Under present standards the 931–A is considered to be a desirable, comparatively inexpensive, high-speed, high-gain tube which is ideal for my purpose.

Since the 931–A photocell (and others having similar characteristics) is sensitive to ultraviolet radiations, I found that in many reading machine applications an ordinary light source (e.g. at 38 in FIGURE 1) was not required. This was due to the fact that the paper used reflected enough ultraviolet, and the dark printed characters absorbed enough of the ultraviolet energy, for the photocell scanner to provide signals sufficient for the reading function.

By using "non-whitened" paper (many grades of paper contain a trace of a fluorescor as a "whitener") the ratio of fluorescent output signal to paper background signal was approximately 3 to 1 as measured with a photocell having an S–4 response. The reflection of an element of a printed character was much lower, depending on its blackness.

I also tested "whitened" paper with a fluorescent mark. When the paper and mark were placed under an ultraviolet lamp, the ratio between the signals from the paper and the mark was 1.2 to 1 or nearly the same. The ordinary dark printing on the same paper, however, reflected very little energy, as before. The effect of this is that to a reading machine, the fluorescent mark did not exist or "disappeared." The above ratios can be altered by selection of fluorescent material and/or adjustment of the exciting radiations.

Referring now particularly to FIGURES 1 and 5–7, I have shown a document mover 34 consisting of an endless conveyor driven by belt 36 which is, in turn, actuated by a motor (not shown). A source of ordinary light, for example incandescent lamp 38 with intensity control 39, is arranged to illuminate document 10 as it passes beneath lens 40 which forms an image of the characters on the photosensitive portion of scanner 42. It is apparent from FIGURE 1 that an image of the marks 11 will also be formed on the scanner as the document moves to the right (as shown) during the scanning procedure. As the scanner extracts data from each character and its surrounding area, the photocell (or photocells) of the scanner provides video information signals which are conducted to the reading machine circuits 46 by way of the conductors in cable 48. The reading machine circuits are designed (as described later) to identify the individual characters.

Ultraviolet lamp 50 is so disposed (as shown in FIGURE 1) as to direct a beam of radiation onto the portion of the document being examined by the scanner. Since it is desirable to adjust the amount of radiation emitted by the fluorescent marks, I have shown the ultraviolet lamp power supply 52 as being adjustable by means of intensity control 51. Thus, my reading machine in FIGURE 1 uses two sources of energy, one being schematically represented as an ordinary illumination lamp 38, and the other being rich in radiation capable of exciting the fluorescent material. Lamp 38 provides the illumination necessary for the scanner photocell to respond to light reflected from the document (or lack of light when the character itself absorbs an appreciable percentage of the light). On the other hand, radiations from the ultraviolet source 50 are used in another manner. These excite the fluorescent material so that the fluorescent material emits energy as opposed merely reflecting energy as do normally printed characters and their background surface when subjected to ordinary light. Controls 39 and/or 52 permit both sources 38 and 50 of energy to be adjusted and/or balanced relative to each other for optimal reading of true characters and energization of the fluorescent marks.

Figure 6:
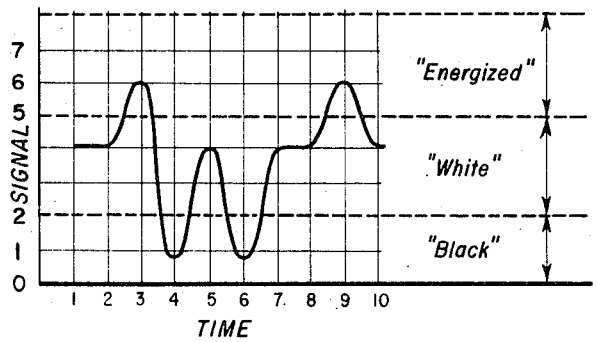
FIGURE 6 shows a graph plotting the output signal of a photomultiplier responding to the scan trace in FIGURE 5 as it passes over the character background, the true character and a fluorescent mark.
Figure 7:
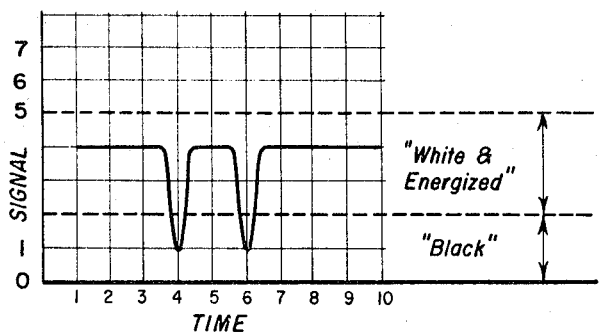
FIGURE 7 shows a graph similar to that of FIGURE 6 except the fluorescence and/or the photocell response thereto is attenuated.

In considering FIGURES 5–7, assume that scan element 56 (a vertically moving scan disc hold or a spot of light) has traversed from position 56a downward to the lowermost position. During its traverse at each of the times 1–10 (or position 1–10) a scan-sample is taken. By using a photocell having an S–4 or an S–11 curve, for instance a 931–A or a 6199, it is quite simple to have the output signal of the photocell resemble the curves in FIGURE 6 or FIGURE 7. If the mark is rich in fluorescent material and/or the fluorescent material is selected so that it has a rather high fluorescence and/or if the radiation emitted from lamp 50 are adjusted to greatly excite the fluorescent material, and the paper has no fluorescent "whitener" in it, the curve shown in FIGURE 6 will be obtained by plotting signal against time for the scan trace shown in FIGURE 5. If the photocell output signal of 0 to +2 volts (after amplification) is assumed to represent "black," and +2 to +5 volt signals are considered "white," anything above the +5 volt signal level is termed "energized" in FIGURE 6 because it resulted from energy emitted from the fluorescent marks. In other words, in this example, signals greater than +5 volts cannot be obtained from the reflections from the clear portion surface of the document.

In FIGURE 7, the curve represents the output signal from the above defined photocell when the fluorescence is adjusted (in one or more of the ways discussed above) so that the emitted energy excites the photomultiplier to approximately the same signal output as the reflections from the ordinarily "white" background of the paper. Thus, by following the illustrated positions of the scan element 56 (FIGURE 5) vertically downward and noting the curve in FIGURE 7, it will be seen that the photomultiplier output signal makes no distinction between the background of the characters and the fluorescent marking 26 in FIGURE 5.

FIGURES 8–14 show in more detail reading machines constructed in accordance with my invention. I have already indicated that it is immaterial to my invention whether or not a particular type of scanner is selected. Thus, in FIGURE 8 I have shown a cathode ray tube 60 with conventional control circuits 61 including sweep generator 62 controlled by clock pulse generator 63 (or an oscillator) to provide vertical scan line traces on the horizontally moving document 28. Projection lens 64 is used in the usual way. Cathode ray tube 60, e.g. an RCA 5WP15 or an RCA 5ZP16, has a phosphor face which emits an appreciable quantity of ultraviolet light together with the usual visible light. By using a suitable optical filter 100 (shown removably mounted in the optical path), the light beam from tube 60 ultimately reaching document 28, can be modified so as to select the ratio between the ultraviolet energy and the visible energy.

As shown in FIGURE 8, photomultiplier 65 is arranged to receive the energy reflected from the surface of document 28. The output signals of the photomultiplier are amplified by amplifier 68 and conducted on line 70 to an AND gate 72. The other entry to the AND gate are clock signals conducted on clock signal line 74, which provide sample times or samples as designated at 1–10 to the left of FIGURE 5 and at 1–10 along the ordinate lines of FIGURES 6 and 7. The signals passed by gate 72 are conducted on lines 76 to quantizer 78. Thus, the quantized video outputs on line 80 are stepped into shift register 82 (or the equivalent) in time with the clock signals (via shift pulse line 84). The temporary storage register 82 is used in the ordinary way and in fact, from the shift register through comparator 86 the reading machine can be assumed to be the same as disclosed in U.S. Patent No. 3,104,369 thereby simplifying this disclosure. As disclosed in that patent the information stored in the shift register is moved to bring it into registry with character standards 88 which are connected by means of lines in cables 90, with selected stages in register 82. The character standards can, for example, be resistor adders exactly as disclosed in the above patent. In addition, the comparator 86 can be triggered by the trigger signal on line 92 exactly in the manner disclosed in the above patent. The purpose of the comparator is to examine the match voltage signals on the output lines from the character standards (there being at least one standard for each possible character) and to select the true character.

The reading machine shown in FIGURE 8 as described above provides means by which the photomultiplier output signals for typical line scan trace can be as shown in FIGURE 6 or in FIGURE 7. However, since fluorescence of typical marks (for instance at 20 and 22 in FIGURE 9) can be distinguished from the background area of the characters without in any way affecting the normal operating black-to-white range of the machine, the detected radiations from the fluorescent marks can be useful in a reading machine. FIGURES 9 and 10 illustrate reading machines which make use of such detected radiations. Document 18 (FIGURE 9) is shown moving to the right by means of document mover 34a. The character area is illuminated by lamp 38 and by ultraviolet source 50. Intensity controls 39 and 51 are the same as described before. An oscillating mirror 104, or the equivalent, is positioned to sweep the image of the character area vertically as it moves horizontally due to horizontal motion of the document. The image of a character reflected from the mirror surface is formed on the face of a photocell retina scanner 105, and the output signals from the various photocells in the columns and rows (as designated) are conducted on the lines of cable 106 to the amplifiers 108. The output signals from the amplifiers are conducted on lines 110 to the logic circuitry 114, thence to the comparator 116.

To simplify this disclosure it can be assumed that amplifiers 108, their use and the logic arrangement (made as electronic masks, by resistor adders) and comparator 116 are similar to those disclosed in Patent No. 3,201,751. In this respect FIGURE 10 shows a simplification of one of the reading machines disclosed in that patent. In FIGURE 10 a character standard 88 for the numeral "3" is shown with its ultimate wiring connections to the assertions and negations terminals of selected amplifiers 108 to form an electronic mask for the character "3." It is understood that there will be at least one standard (not shown) for each character. As disclosed in the above patent I use capacitor storage 126, and at the appropriate time a trigger signal is developed on line 130 to actuate the comparator, and this has the effect of identifying the character whose capacitor 126 (126a, etc.) contains the "best" charge at the instant of interrogation by the comparator.

In FIGURE 10, however, each character standard has a match signal line 151 (151a, etc.) connected to an AND gate 150 (150a, etc.) whose output line 153 (153a, etc.) is used to charge its capacitor 126 (126a, etc.) through diode 156 (156a, etc.). Lines 157, 157a, etc. are connected as inputs to comparator 116. With an arrangement such as this I can use control signals extracted from the fluorescent marks to aid in identifying the characters as explained below.

Figure 4:
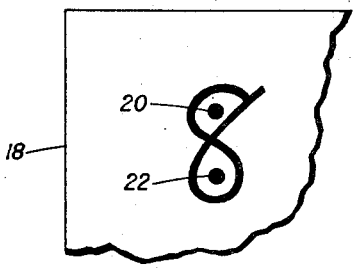
FIGURE 4 is a fragmentary view showing a document having another type of constraint mark for hand-printed characters.

Assuming the constraint of FIGURE 4, I can obtain a control signal on line 146 by detecting the "energized" signals resulting from exposure of photocells 2c and 6c (FIGURE 9 and FIGURE 10) to signals greater than those resulting from exposure of the same photocells to the "white" background area of the characters. In this case, the signal on bus 146 gates the signals on lines 151, 151a, etc. into their respective capacitors 126, 126a, etc. Thus (see FIGURE 9) as the character image is swept horizontally over the retina of the photocells it is moved vertically in an oscillatory path. At the instant (and consequently the position) that the fluorescent radiations from marks 20 and 22 fall upon photocells 2c and 6c, the signals on the amplifier output lines 140 and 142 are quantized by quantizers 148 and 149. These quantizers have thresholds greater than the highest level of signal representing the character background (+5 volts in the example). The output signals of the quantizers are conducted to coincidence gate 144 which provides the control signal on line 146 which is impressed as an enable signal on each gate 150, 150a, etc. Thus, the capacitors are charged with signals conducted from their respective standards at the time of vertical (and horizontal) registration of marks 20 and 22 with photocells 2c and 6c. At the time of the trigger signal on line 130, the signals stored in the capacitors are sampled for the comparator to make a character-identity decision. Thereafter the capacitors are restored as in Patent No. 3,201,751.

While the two dot constraint of FIGURE 4 was discussed above, it is evident that by selecting different elements (photocells in FIGURE 9) in the field of view of the image, the constraint marks of FIGURE 3, or marks 17 (lines) of document 19 in FIGURE 3a can be used. In fact, the circuit shown at the lower part of FIGURE 10, using photocells 2c and 6c will detect lines 17 of FIGURE 3a. However, it may be preferable to use both entire rows 2 and 6 of FIGURE 9 to detect the horizontal guide lines in FIGURE 3a.

Figure 11:
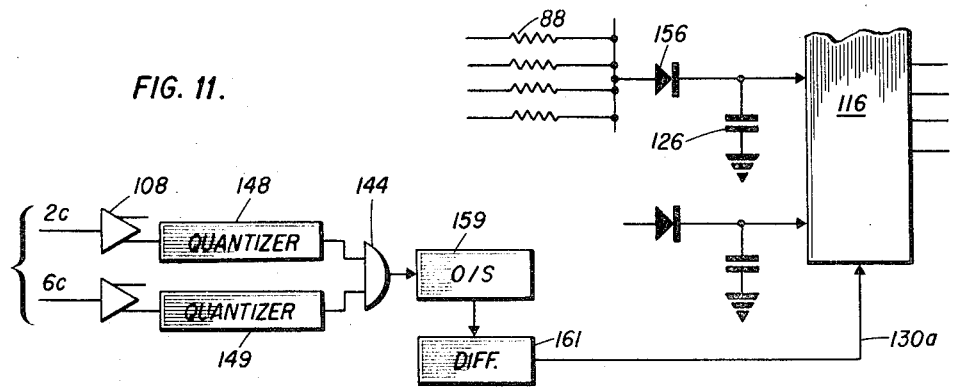
FIGURE 11 is a fragmentary schematic view showing means to provide a reading machine control signal different from the control signal obtained from the fluorescent marks, obtained in the machine of FIGURE 10.

The above describes only a few ways that a machine control signal can be extracted from a fluorescent mark and used by the machine because the mark is machine-distinguishable from the true characters and their background surface. Another is shown in FIGURE 11 where the control signal is a trigger signal which can be used instead of the signal on line 130. As disclosed in Patent No. 3,201,751, the trigger signal (on line 130 herein)

is derived from the clear space between characters, but sometimes such a signal is not given for example when adjacent characters touch each other. The trigger signal on line 130a (FIGURE 11) does not depend upon a space between characters and therefore, it is not subject to the above difficulty. As explained below, the trigger signal on line 130a (for comparator 116) is extracted from fluorescent marks 20 and 22, i.e. when they are registered with cells 2c and 6c.

In FIGURE 11 the character standards 88 (only one shown), diodes 156, capacitors 126 and comparator 116 can be the same as in Patent No. 3,201,751; while amplifiers 108, quantizers 148 and 149 and coincidence gate 144, are identical to those shown in FIGURE 9. However, instead of trigger signal line 130, I have trigger signal line 130a for conducting a signal to comparator 116, which is obtained as follows. When there is coincidence at gate 144 (as before), the gate output signal fires one shot multivibrator 159. The trailing edge of the one shot output is differentiated by differentiator 161, and the output of the differentiator is conducted as a trigger signal on line 130a. This circuit has the following effect: The one shot has a duration slightly greater than the time required for the character image to vertically sweep over scanner 105 (e.g. one clockwise oscillation of mirror 104). Thus, the one shot will be first actuated when marks 20 and 22 first register with cells 2c and 6c, and will be continually recycled during all of those vertical excursions of the imagine in which marks 20 and 22 are in horizontal registry with cells 2c and 6c. Since differentiator 161 responds to the trailing edge of the one shot signal, the differentiator will yield the trigger signal (on line 130a) only upon decay of the one shot signal, i.e. shortly after the marks 20 and 22 have horizontally passed photocells 2c and 6c.

Figure 12:
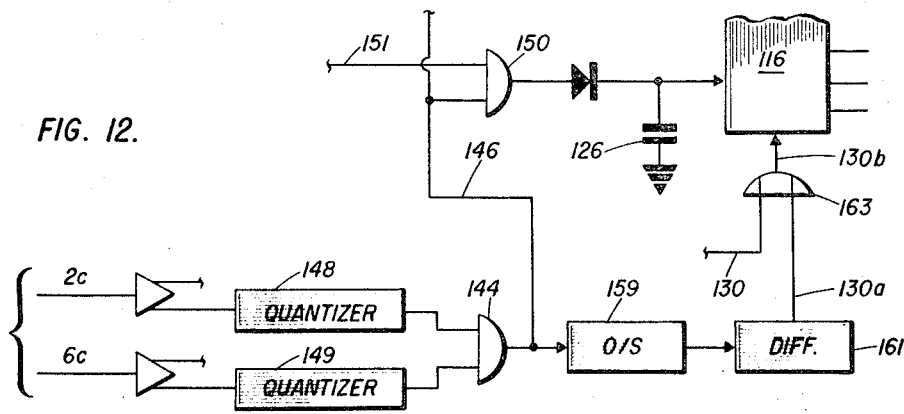
FIGURE 12 is a view similar to FIGURES 10 and 11, wherein the functions of the control signal developing means are combined.

It can now be said that the control signal on line 146 of FIGURE 10 is primarily concerned with "when to read" relative to vertical positioning, while the control signal on line 130a, among other things, is primarily concerned with "when to read" relative to horizontal positioning of marks 20 and 22. A combination caring for both considerations, is shown in FIGURE 12 which discloses a combination of the pertinent circuit features of FIGURES 10 and 11. Thus, a signal on line 146 (FIGURE 12) gates the match signal on line 151 into capacitor 126 each time that gate 144 passes a signal. If capacitor storage is not used, the match signal would be gated directly into comparator 116 which is not triggered unless there is a signal on line 130b. This line is the output conductor of OR gate 163, which passes either a trigger signal on line 130 (extracted from the clear space between characters) or a trigger signal on line 130a (obtained as described in connection with FIGURE 11).

While document 21 (FIGURE 3b), having fluorescent marks 23 formed as guide lines, resembles document 19 (FIGURE 3a), they are shown separately to avoid confusion between the use by the machine of lines 23 and marks 17. The control signals obtained from marks 17 are used to trigger the reading machine while marks 23 (although identical to marks 17) are used to obtain servo control signals to a scanner to one or more of the lines 23, or to servo the document to the scanner. The overprint shown in FIGURE 3d will have little or no effect on the servo function as noted below.

Figure 13:
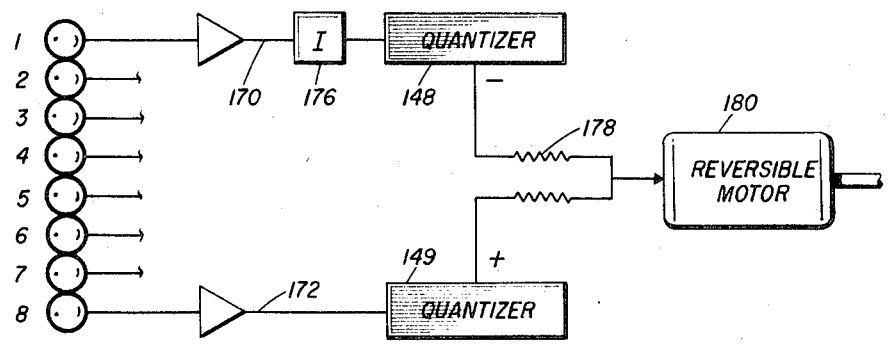
FIGURE 13 is a fragmentary view showing means by which to obtain a different type of control signal for a reading machine.

It is, perhaps simplest to explain a servo system by referring to U.S. Patent No. 3,069,494 and to FIGURE 13 herein. In both disclosures there is a scanner made of a vertical row of eight photocells 1–8 across which the image of a true character is swept, or vice versa. In FIGURE 13, photocells 1 and 8 have their amplified signals on lines 170 and 172 conducted to quantizers 148 and 149. However, inverter 176 is interposed in line 170 to change the polarity of its signal. The output signals from the quantizer are mixed by adder 178 and the resulting signal is impressed on reversible motor 180 which is similar to the corresponding motor in Patent No. 3,069,494. To make reference to this patent unnecessary, it is explained herein that motor 180 provides a mechanical servo correction (by clockwise or counterclockwise movement of the motor shaft) in response to the sense of signal impressed on the motor. The correction either shifts the document or the scanner slightly until the servo signal impressed on the motor becomes zero. In my case this would be when both photocells 1 and 8 detect the two fluorescent lines 23. Obviously, the servo function is obtainable regardless of whether there are true characters between or adjacent to the lines because quantizers 148 and 149 will not fire upon detection of true characters. This is stressed as being one of the meritorious features of my invention as explained below.

Until now the control signals for reading machines, which are extracted from the documents, have originated from the same light spectrum or range as the characters and their background. To my knowledge no one before me has suggested that the marks could be "dark" to the eye (easily seen) and yet, to the machine they appear "brighter" than the lightest part of the reading surface.

As described in connection with FIGURE 6, under certain conditions the entire, normal signal range representing black-to-white (0 volt to +5 volts in the example) can be left available for identifying true characters while the energized marks are separately detectable since the output signals originating therefrom are in another range (e.g. above +5 volts). In view of this it is possible to separately recognize the fluorescent marks regardless of their configuration and/or meaning and/or purpose. For example, the documents can have sorting (or other) marks in any form including numeric, alphabetic or both, and these can be identified to the exclusion of the true characters. Alternatively, the marks can be identified concurrently with the true characters.

Figure 14:
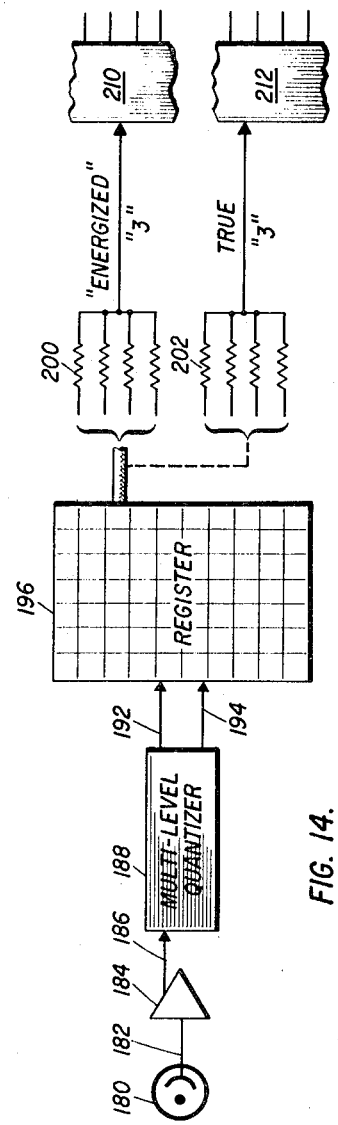
FIGURE 14 is a fragmentary view showing features of a reading machine by which use is made of signals derived from fluorescent matter on a document.

It is possible to design electronic masks for "energized" marks in an alphanumeric form. In such a machine the multi-level quantizer disclosed in U.S. Patent No. 3,166,743 could be used by assigning one signal range (e.g. the highest) to represent "energized" marks, while the other three ranges disclosed in that patent could correspond to "white", "gray" and "black" respectively. FIGURE 14 shows a machine such as this, although it is to be clearly understood that other designs for the machine are indeed possible. The scanning photocell 180, e.g. a 931–A photomultiplier, has its signals on line 182 amplified at 184 and conducted on line 186 as analog input signals to the multi-level quantizer 188 which can be substantially identical to the quantizer disclosed in U.S. Patent No. 3,166,743. As such, coded output signals representing discrete levels of input signals, are conducted on lines 192 and 194 to a shift register 196 capable of storing the various coded signal representing the discrete signal levels. The shift register in U.S. Patent No. 3,104,372 is excellent for this purpose.

Character standards 200 and 202 for an "energized 3" and a "true 3" are connected to shift register 196 as follows. The resistors of the "energized" 3 standard are connected to the "energize" terminals of the proper stages of register 196, while the resistors of the true "3" standard are connected to the same stages of the register, but to the coded output terminals representing "black", "gray" and "white". It is understood that the term "energize" is used to mean signals derived from the fluorescent marks, which are characters in this instance.

By using separate comparators 210 and 212, one for the "energize" and the other for the true characters, I can obtain a variety of results. One comparator can be used at the same time or to the exclusion of the other. When used simultaneously, a particularly desirable result can be obtained. The machine (comparator 210) can provide sorting (or other) instructions by account number, code, name, product, etc., and during the same document-handling operation the true characters can be identified (comparator 212) to provide all of the data represented thereby.

Various modifications falling within the scope of the following claims may be resorted to. In addition, certain terminology is used here to simplify the disclosure, and it is not intended that this terminology impose unnecessary limitation on the protection as afforded by the claims. For instance, I spoke of a range of photmultiplier-amplifier output signals from substantially 0 to something about 5 volts. Certainly, any reference can be used. For instance, Patent No. 3,104,369 speaks of a swing in voltage about zero between approximately +6 and —6 volts for black and white respectively. Patent No. 3,201,751 mentions a swing to ten volts. Selection of voltages such as this are mere design parameters.

I claim:

1. In an optical character reading machine for dark characters formed on a surface which is more reflective of light than the characters, a scanner to provide distinguishable output signals originating from an examination of said surface and a said character, said surface having a mark thereon visible to the human eye under ordinary light to provide a visual guide or other indication on the surface, said mark including a fluorescent substance which emits predetermined energy in the presence of exciting radiations, said scanner including a photocell having approximately the same response to ordinary light reflected from said surface and to said predetermined energy so that said mark although visible to the human eye is substantially indistinguishable from said surface by said photocell, and means responsive to said output signals to identify the character on the basis of signals originating from the character substantially as though said mark were not present on the surface.

2. For use with a document having a fluorescent mark forming a guide for a hand-printed character, a reading machine including a scanner providing output signals upon examination of the character, means for detecting the signals originating from said fluorescent mark to provide a control signal, recognition means responsive to said output signals to identify the character, and means responsive to said control signal for controlling said recognition means.

3. For use with a document having a visible fluorescent mark in addition to true characters to be identified, an optical character reading machine having a scanner photocell to examine the document and provide output signals corresponding to a true character and its background, recognition means responsive to said output signals to identify the true character, means including said photocell to detect said visible fluorescent mark and to provide a control signal corresponding thereto, and means responsive to said control signal to exercise a control function over the machine.

4. The subject matter of claim 3 wherein said means responsive to said control signal include an electrical circuit to control the reading of the character.

5. The subject matter of claim 3 wherein said means responsive to said control signal include an electrical servo circuit to effect the registration between the scanner and the true character on the document.

6. In a reading machine for characters formed on a surface whereon there is a mark which is visible to the human eye and which contains a substance that emits energy in the presence of radiations of wave lengths capable of exciting said substance, the combination wherein
 (a) said surface is optically light to be reflective of light,
 (b) said characters are optically dark to be light absorbing,
 (c) said mark contains a fluorescent material to emit said energy as aforesaid, and
 (d) said reading machine has a photosensitive scanner including a photocell and associated circuitry differentially responsive to said surface and said characters and said mark, said photocell providing corresponding output scan signals upon the scanning of said surface and its characters and mark,
 (e) the optical lightness of said surface together with the response of said photocell cooperating with each other to provide scan signals within a first range of value upon scanning of said surface, and
 (f) the optical darkness of said characters together with the response of said photocell cooperating with each other to provide scan signals within a second range of value upon scanning of said characters,
 (g) the energy emitted by the fluorescent material of said mark together with the response of said photocell cooperating with each other to provide scan signals within a third range of value upon scanning of said mark, and
 (h) said third range of value is substantially similar to said first range of value with the consequence that the scan signals resulting from scanning said mark are substantially indistinguishable from the scan signals resulting from scanning said surface.

References Cited

UNITED STATES PATENTS

| | | | |
|---|---|---|---|
| 2,943,208 | 6/1960 | Shepard | 340—146.3 |
| 3,056,033 | 9/1962 | Shepard | 250—83.3 X |
| 3,163,758 | 12/1964 | Treacy | 250—219 |
| 3,176,140 | 3/1965 | Schroth | 250—219 |

OTHER REFERENCES

IBM Technical Disclosure Bull., vol. 7, No. 10, p. 940; March 1965.

MAYNARD R. WILBUR, *Primary Examiner.*

R. F. GNUSE, *Assistant Examiner.*

U.S. Cl. X.R.

250—71